Patented Nov. 25, 1941

2,264,217

UNITED STATES PATENT OFFICE 2,264,217

DRIVING GEAR FOR AUTOMATIC LATHES

William Ogilvie, Knowle, England, assignor to B. S. A. Tools Limited, Birmingham, England, a British company Application February 27, 1941, Serial No. 380,929
In Great Britain February 27, 1940

2 Claims. (Cl. 74—376)

This invention relates to driving gear for automatic lathes of the type having a reversible work spindle operated by a friction reversing clutch.

In automatic lathes of the aforesaid kind it is usual practice to provide means whereby the speed of rotation of the spindle can be changed or varied for both right and left hand direction of rotation in order to obtain suitable cutting speed for different sizes of work piece, and also to obtain suitable speeds for cutting threads. According to one known arrangement such has been effected by means of a change speed gearing comprising a driving shaft and a driven or lay shaft disposed in parallel relation and connected by gear wheels, the said shafts having freely mounted thereon inter-engaging gear wheels to provide different speed ratios, in conjunction with a laterally displaceable clutch device mounted on the driven or lay shaft and adapted to operatively connect either one of the gear trains to said driven shaft, whereby both the right and left hand speeds of the work spindle can be either increased or decreased as may be required.

The object of the invention is to provide an improved construction and arrangement of driving gear of the aforesaid kind which is adapted to provide simple means whereby further or additional variations in the ratio of the higher speed of the work spindle in one direction in relation to the lower speed in the other direction can be readily obtained.

According to this invention the driving gear comprises parallel driving and driven shafts, characterized in that the driving shaft consists of two co-axial parts adapted to be coupled by a friction clutch the inner member of which is slidably mounted on the first part of said driving shaft and arranged to engage with an outer clutch member fixed to the second part of said driving shaft, and wherein the said first part of the driving shaft has freely mounted thereon a longitudinally confined sleeve part on which is formed or fitted an outer clutch member for engagement with the slidable inner clutch member, a chain sprocket or pulley for driving one part of a friction reversing clutch on the work spindle, and a gear wheel in mesh with a gear wheel fixed to a driven or lay shaft on which latter is fixed a chain sprocket or pulley for driving the other part of the reversing clutch on the work spindle, and wherein the outer ends of said driving and driven shafts are coupled by readily detachable change gear wheels.

In order that the invention may be clearly understood, I will now describe same with reference to the accompanying drawings, in which.

Figure 1:
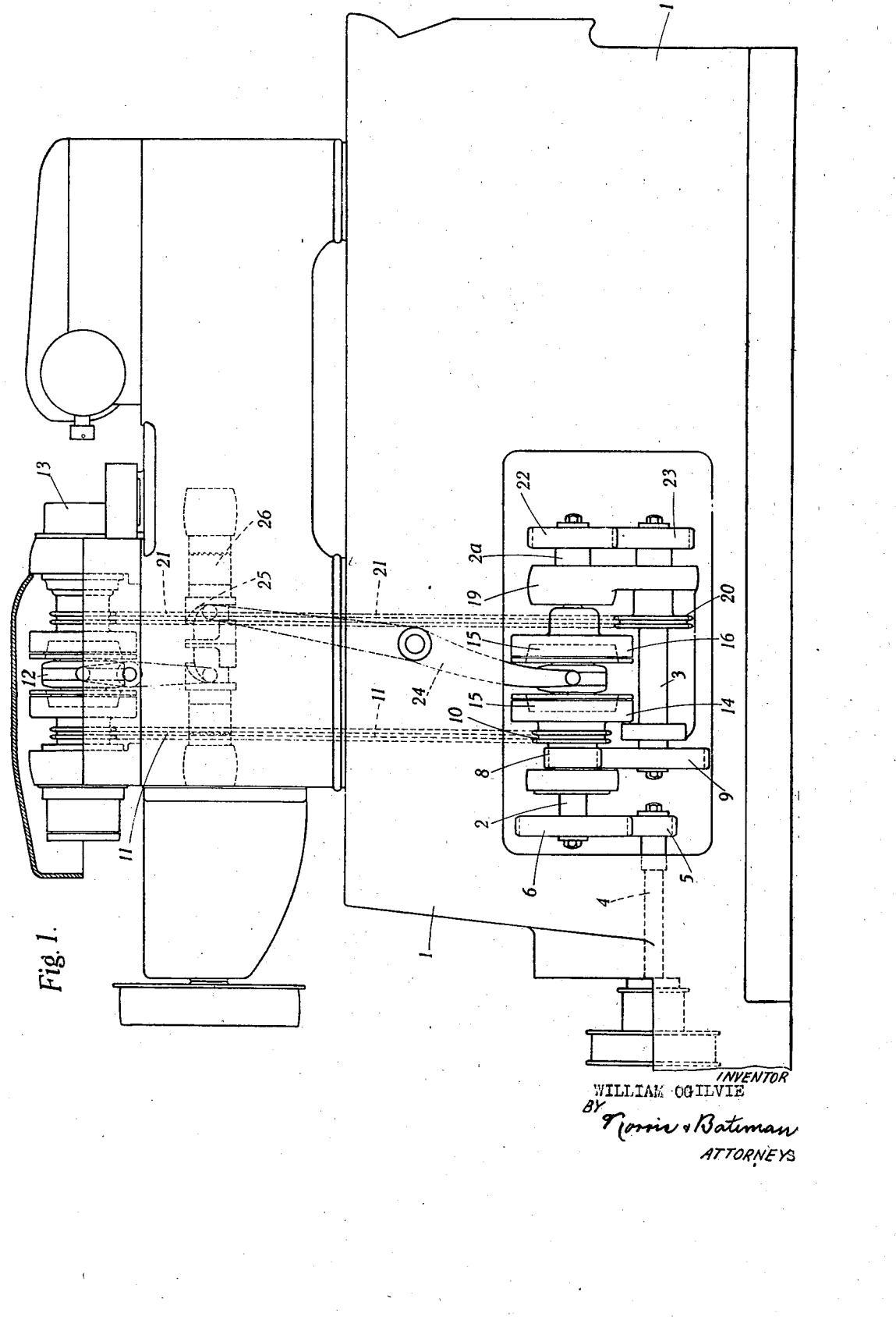
Figure 1 shows a front elevation of an automatic lathe embodying the features of this invention.
Figure 2:
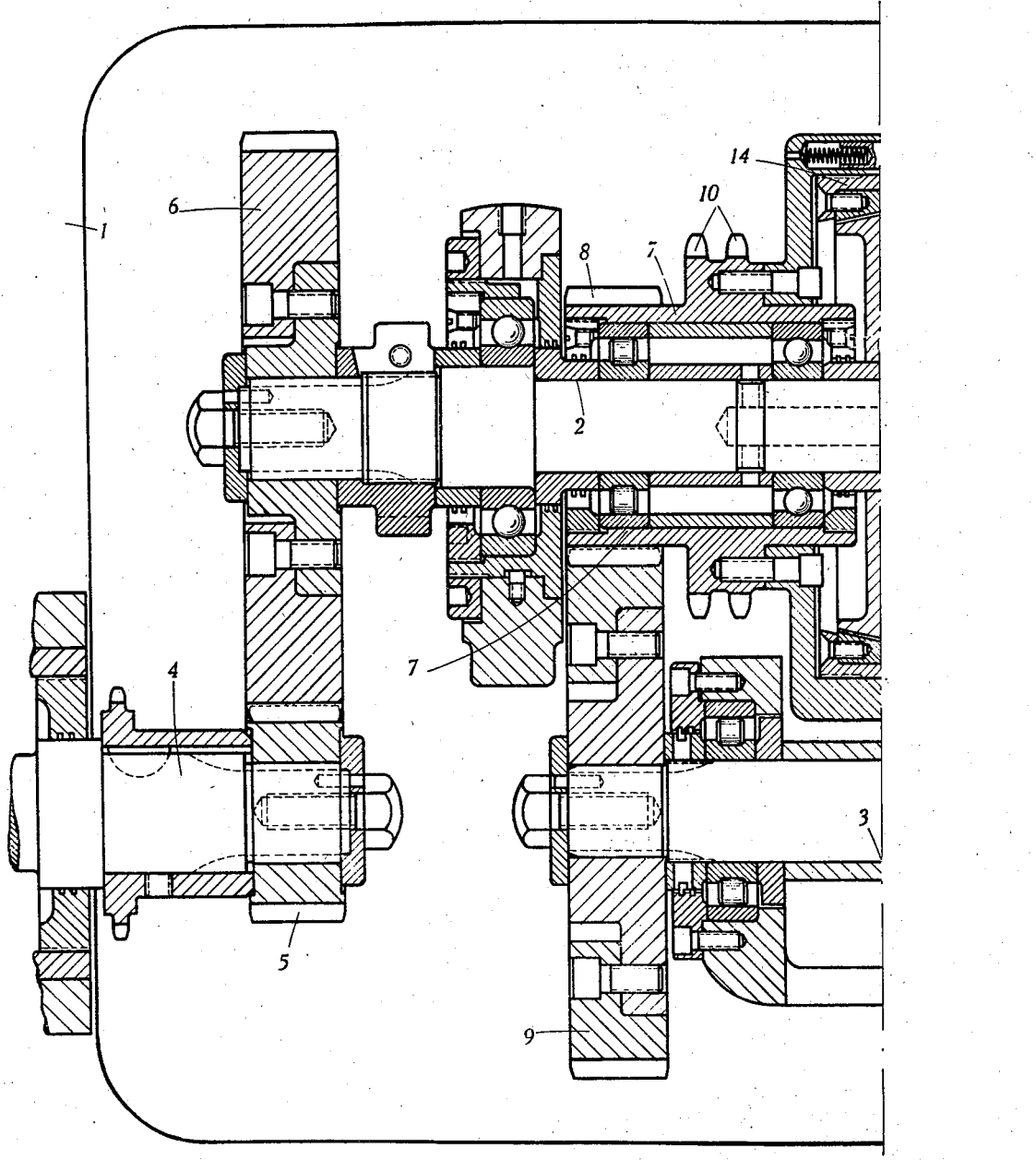
Figure 2 shows a sectional elevation of the driving gear on an enlarged scale.
Figure 2A:
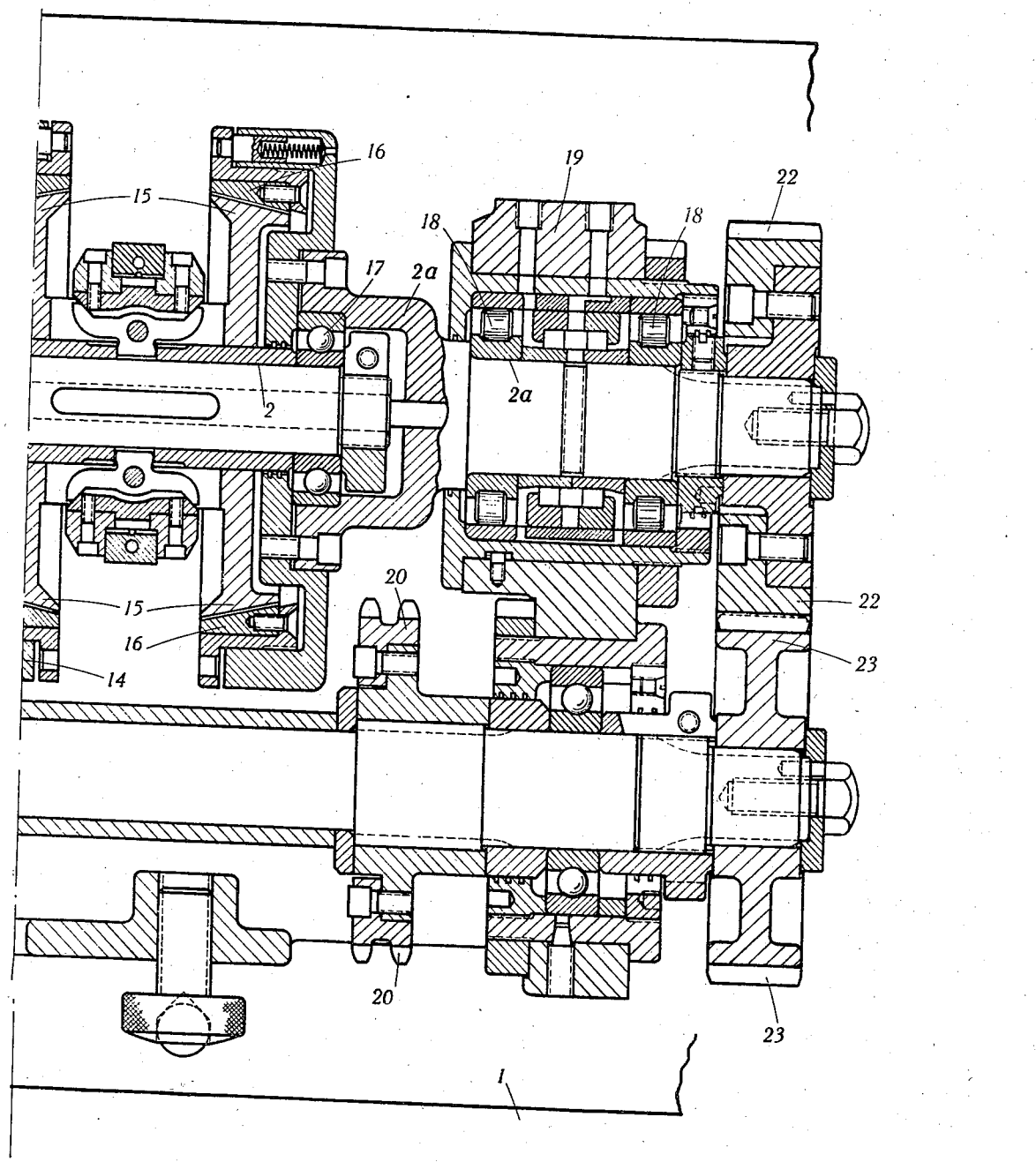

According to one convenient mode of carrying the invention into practical effect, as illustrated in the drawings, on a frame or apron adapted for attachment to the frame 1 of the machine are mounted in suitable bearings a driving shaft 2, 2a and a driven or lay shaft 3 disposed in parallel relation. The aforesaid driving shaft is formed in two parts in co-axial alignment, the first part 2 of said driving shaft being connected at its outer end to the main driving shaft 4 of the machine by suitable gearing 5 and 6, and on the inner part thereof is freely mounted on anti-friction bearings a sleeve 7 on which is formed or fitted a gear wheel 8 in constant mesh with a gear wheel 9 fixed to the driven or lay shaft 3. A chain sprocket 10 on said sleeve 7 is connected by driving chain 11 with one part of the friction reversing clutch 12 on the work spindle 13, and on the inner face of said sleeve 7 is fitted a friction cone 14 adapted for engagement with one part of a double coned inner clutch member 15 which is slidably keyed on the aforesaid first part 2 of the driving shaft. On the inner end of the second part 2a of the divided driving shaft is formed or fitted a friction cone 16 adapted to be engaged by the slidable inner clutch member 15 when the two parts of the driving shaft are coupled. In a preferred arrangement the friction cone 16 and the inner end of the second part 2a of the driving shaft are arranged to overhang the inner end of the first part 2 of the driving shaft, the said parts being supported by an interposed anti-friction bearing 17, which is arranged and adapted in known manner to prevent axial displacement of the part 2 of the driving shaft. The middle part of the second part 2a of the driving shaft is carried by anti-friction bearings 18 mounted in a bracket 19 formed on the frame or apron adapted to be detachably mounted in known manner in the frame 1 of the machine.

The driven or lay shaft 3 is, as previously stated, connected by a gear wheel 9 fixed thereon with a gear wheel 8 on the freely mounted clutch sleeve 7 on the driving shaft 2 and has fixed thereto a chain sprocket 20 which is connected by a driving chain 21 with the second part of the friction reversing clutch 12 on the work spindle 13.

On the outer end of the second part 2a of the driving shaft and on the end of the driven or lay shaft 3 are detachably mounted gear wheels 22 and 23 of any desired ratio, adapted to readily provide for a variation of the ratio of the higher speed of the work spindle 13 in one direction to the lower speed in the other direction.

In the operation of the mechanism, movement of the slidable double coned inner clutch member 15 to the right, by any suitable known means, such as a pivoted forked lever 24 operated by a cam 25 on an auxiliary control shaft 26, couples together the two parts 2 and 2a of the driving shaft, when the drive to the driven or lay shaft 3 is through the gears 22 and 23 mounted on the outer ends of the said driving and driven shafts, and the gear wheel 9 on the driven or lay shaft 3 imparts rotary movement to the sleeve 7 freely mounted on the driving shaft 2 through the gear wheel 8 on said sleeve. Movement of the aforesaid inner clutch member 15 to the left uncouples the two parts of the driving shaft 2 and couples to said shaft the sleeve part 7, and rotary motion is then imparted to the driven shaft 3 by the gear wreel 8 on said sleeve engaging with the gear wheel 9 fixed to the said driven or lay shaft 3.

Having thus described my invention, what I claim as new and desire to secure by Letters Patent is:

1. A driving gear for automatic lathes wherein the driving shaft consists of two co-axial parts coupled by a friction clutch the inner member of which is slidably mounted on the first part of said driving shaft and arranged to engage with an outer clutch member fixed to the second part of said driving shaft, a sleeve part longitudinally confined and freely mounted on said first part of the driving shaft on which is formed or fitted an outer clutch member for engagement with the slidable inner clutch member, a chain sprocket or pulley on said sleeve part for driving the work spindle in one direction, a gear wheel fixed on said sleeve part and in mesh with a gear wheel fixed to a driven or lay shaft, a chain sprocket or pulley fixed to said driven or lay shaft for driving the work spindle in the other direction, and wherein adjacent ends of the said driving and driven shafts are coupled by detachable change gear wheels.

2. A driving gear for automatic lathes according to claim 1, wherein one end of one part of the divided driving shaft overhangs the opposing end of the other part of said driving shaft, said opposing ends of the divided driving shaft being supported by an anti-friction bearing which also prevents axial displacement of the first part of said divided driving shaft.

WILLIAM OGILVIE.